(12) United States Patent
Tzeng et al.

(10) Patent No.: US 11,158,850 B2
(45) Date of Patent: Oct. 26, 2021

(54) COMPOSITE ELECTRODE MATERIAL AND METHOD FOR MANUFACTURING THE SAME, COMPOSITE ELECTRODE CONTAINING THE SAID COMPOSITE ELECTRODE MATERIAL, AND LI-BASED BATTERY COMPRISING THE SAID COMPOSITE ELECTRODE

(71) Applicant: National Cheng Kung University, Tainan (TW)

(72) Inventors: Yon-Hua Tzeng, Tainan (TW); Wei-Chih Huang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 272 days.

(21) Appl. No.: 16/217,180

(22) Filed: Dec. 12, 2018

(65) Prior Publication Data

US 2019/0393488 A1 Dec. 26, 2019

(30) Foreign Application Priority Data

Jun. 21, 2018 (TW) .................................. 107121321

(51) Int. Cl.
*H01M 4/36* (2006.01)
*H01M 4/62* (2006.01)
*H01M 4/38* (2006.01)
*H01M 10/0525* (2010.01)
*H01M 4/587* (2010.01)

(52) U.S. Cl.
CPC ........... *H01M 4/366* (2013.01); *H01M 4/382* (2013.01); *H01M 4/386* (2013.01); *H01M 4/387* (2013.01); *H01M 4/587* (2013.01); *H01M 4/625* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2008/0261116 A1* | 10/2008 | Burton | .................. | H01M 4/366 429/231.8 |
| 2015/0263337 A1* | 9/2015 | Naoi | .................... | H01M 4/1391 429/231.1 |
| 2016/0344020 A1* | 11/2016 | Tzeng | .................... | H01M 4/366 |
| 2017/0194137 A1* | 7/2017 | Aarts | ...................... | H01L 29/30 |
| 2019/0067681 A1* | 2/2019 | Tzeng | ............... | H01M 10/0525 |

* cited by examiner

*Primary Examiner* — Tracy M Dove
(74) *Attorney, Agent, or Firm* — Bacon & Thomas, PLLC (57) ABSTRACT

A novel composite electrode material and a method for manufacturing the same, a composite electrode containing the said composite electrode material, and a Li-based battery comprising the said composite electrode are disclosed. Herein, the composite electrode material of the present invention comprises: a core, wherein a material of the core is at least one selected from the group consisting of Sn, Sb, Si, Ge, C, a compound thereof and a complex thereof; and a conductive carbon nanoparticle, wherein the conductive carbon nanoparticle grows on a surface of the core.

12 Claims, 13 Drawing Sheets

COMPOSITE ELECTRODE MATERIAL AND METHOD FOR MANUFACTURING THE SAME, COMPOSITE ELECTRODE CONTAINING THE SAID COMPOSITE ELECTRODE MATERIAL, AND LI-BASED BATTERY COMPRISING THE SAID COMPOSITE ELECTRODE

CROSS REFERENCE TO RELATED APPLICATION

This application claims the benefits of the Taiwan Patent Application Ser. No. 107121321, filed on Jun. 21, 2018, the subject matter of which is incorporated herein by reference.

BACKGROUND OF THE INVENTION

1. Field of the Invention

The present invention provides a composite electrode material and a method for manufacturing the same, a composite electrode containing said composite electrode material, and a Li-based battery comprising said composite electrode. More particularly, the composite electrode material is a silicon nanoparticle with a conductive carbon nanoparticle grown on a surface of the silicon nanoparticle so as to cover the silicon nanoparticle, and the present invention provides the said composite electrode material and a method for manufacturing the same, a composite electrode containing the said composite electrode material, and a Li-based battery comprising the said composite electrode.

2. Description of Related Art

Lithium ion battery is nowadays considered as one of the most efficient ways to store energy due to its advantage of high working voltage, high energy density, long lifespan of storage, and repeated charge/discharge. At present, graphite is a common commercial material for a negative electrode of Li-ion battery, and the theoretical capacity value thereof is about 372 mAhg$^{-1}$. However, a solid electrolyte interphase (SEI) formed after the first charge results in an irreversible capacity loss, and thus the actual capacity value of the electrode is lower than the theoretical value of the electrode. The process of repeated charge/discharge causes gaps between layers of the graphite structure, and thus it leads to the fragmentation of the graphite and storage capacity loss. With the advance of science and technology, simple graphite electrode is unable to meet the needs of the public nowadays.

Silicon has drawn lots of attention because it has a theoretical capacity value of up to 4200 mAhg$^{-1}$. However, the charge/discharge process of silicon leads to a change in volume by about 420%. Therefore, it is likely to cause pulverization of silicon, and thus the pulverized silicon particles losses conductive contact among themselves. Thereby, lithium ions cannot be successfully stored and released, and thus the capacity will decrease. At the same time, newly exposed surfaces of the pulverized silicon particles will consume the electrolyte and react with it to form a new SEI. After repeated charge/discharge, the electrolyte is continuously consumed and then depleted by generating new SEI, resulting in a shortened battery lifespan.

Therefore, there is an urgent need to develop a composite electrode material, which can overcome the defects caused by repeated charge/discharge in order to improve the lifespan of the Li-based battery and to achieve a high storage capacity.

SUMMARY OF THE INVENTION

The present invention provides a novel composite electrode material and a method for manufacturing the same, a composite electrode containing the said composite electrode material, and a Li-based battery comprising the said composite electrode. The novel composite electrode material of the present invention uses a silicon nanostructure covered by a conductive carbon nanoparticle or uses a nanoparticle containing a compound having silicon as a main component. Therefore, after repeated charge/discharge, the Li-based battery maintains excellent capacity and efficiency, or increases battery cycle life.

The present invention provides a composite electrode material, comprising: a core, wherein a material of the core is at least one selected from the group consisting of Sn, Sb, Si, Ge, C, and a compound thereof and a complex thereof; and a conductive carbon nanoparticle, wherein the conductive carbon nanoparticle grows on a surface of the core. The composite electrode material further comprises an additive promoting and accelerating a growth of the conductive carbon nanoparticle, hereinafter referred to as a catalyst, and the conductive carbon nanoparticle covers on the catalyst. The catalyst may accelerate the growth of the conductive carbon nanoparticle.

The present invention also provides a method for manufacturing a composite electrode material, comprising steps of: providing a core in a chamber, wherein a material of the core is at least one selected from the group consisting of Sn, Sb, Si, Ge, C, a compound thereof and a complex thereof; and growing a conductive carbon nanoparticle on a surface of the core at a predetermined temperature by chemical vapor deposition with a catalyst, wherein the conductive carbon nanoparticle covers on the catalyst. The catalyst may accelerate the growth of the conductive carbon nanoparticle.

In the composite electrode material and the method for manufacturing the same, the material of the core is preferably Si so that it may provide high a capacity value. The shape and size of the core are not particularly limited. Preferably, the core is a flat particle, because a flat Si particle is more elastic and flexible, and is not easily broken during charge/discharge. Besides, the surface area of the flat Si particle is much less than the Si particle in other shapes such as round and square when the total volume of the flat Si particle after pulverization is the same as the total volume of the Si particle in other shapes. Therefore, the consumed electrolyte for forming the SEI on the surface of the flat Si particle is less, which is beneficial for prolonging the battery lifespan. In addition, the electrode composed of the flat shaped and nano-scaled Si flake has a smaller internal resistance than that of the electrode composed of Si nanoparticles due to the lack of the contact resistance between the Si nanoparticles, and thus it facilitates a larger charge/discharge current.

Herein, the size of the core is not particularly limited. For instance, a thickness of the flat core may be in a range from 50 nm to 500 nm, and preferably from 50 nm to 200 nm. An average length of the core may be in a range from 100 nm to 9 μm, and preferably from 400 nm to 1500 nm. However the present invention is not limited thereto.

Since the carbon covers onto a catalyst particle to form a carbon nanoparticle when a carbon-containing molecule contacts the catalyst, it may reduce an occurrence of exposure of the catalyst to the electrolyte. The catalyst may, by way of example and not limitation, be a metal catalyst such as Fe, Mo, Ni, Co and Pt, or a non-metal catalyst such as a nanostructured silicon oxide, nanodiamond and nanocarbon black. Preferably, the catalyst is a Fe-based catalyst. More preferably, the catalyst is a Fe-based compound present in a solid form and having a high volatility at low temperature, and present in a gas form in the reactive chamber after heating. For example, the catalyst may be ferric chloride or ferrocene. However, the catalyst of the present invention is not limited thereto as long as it can be used for promoting and accelerating the growth of a conductive carbon nanoparticle. A carbon source used in the present invention is not particularly limited. Any known gaseous, solid, or liquid carbon source, such as methane, ethyne, camphor or alcohol, may be used herein as long as it can be used to grow a conductive carbon nanoparticle. Preferably, the carbon source is solid at room temperature and has a high volatility at low temperature. In one embodiment of the present invention, ferrocene is used as a catalyst. Since the ferrocene may serve as a carbon source and an iron source at the same time, the process may be simplified.

In addition, the conductive carbon nanoparticles directly grows on a surface of the core, which further reduces the electrical resistance while providing a conductive path between the silicon flake and its surrounding in the battery. Because of the gap formed by the height of the conductive carbon particle and the distance between the particles, a buffer function for volume change in the silicon flake is provided. Therefore, it may reduce the silicon flake's fragmentation caused by volume change in the silicon during charge/discharge cycle. Furthermore, the carbon film formed by the conductive carbon nanoparticles coating on the silicon flake may reduce the contact between the silicon flake and the electrolyte of the battery so as to avoid the formation of a solid electrolyte interphase (SEI); also, it may enhance the strength of the silicon flake, and thus the occurrence of fragmentation may be reduced.

Herein, the size of the conductive carbon nanoparticle is not particularly limited. A diameter of the conductive carbon nanoparticle may, by way of example and not limitation, be in a range from 1 nm to 100 nm, and preferably from 20 nm to 50 nm. However, the present invention is not limited thereto.

In one embodiment of the present invention, the chemical vapor deposition may comprise a step of: using a rotating machine or an agitating machine to evenly mix the conductive carbon nanoparticle and the core. Thereby, the conductive carbon nanoparticles may grow on each core more evenly. Herein, the speed of rotation or agitation is not particularly limited and may be changed depending on the used rotating or agitating device, as long as the conductive carbon nanoparticles can evenly grow on each core. Furthermore, the conditions for implementation of the chemical vapor deposition are not particularly limited, and may be adjusted depending on the desired shape and size of the conductive carbon nanoparticle to be grown.

In another embodiment of the present invention, the chemical vapor deposition may comprise a step of: controlling a heating zone by a mobile heating device in order to control a volatilization rate of raw materials.

In yet another embodiment of the present invention, the chamber may comprise a baffle plate disposed on two sides of the chamber to increase the residence time of the gas of the raw materials, and thus it may affect the coating coverage of the conductive carbon nanoparticle and reduce unnecessary waste. Herein, the baffle plate according to one embodiment is a quartz plate. However, the present invention is not limited thereto.

In the present invention, the coating amount of the conductive carbon nanoparticle may be further controlled by controlling the gas residence time, the volatilization rate of the raw materials, and the ratio of the raw materials to meet various application requirements.

The chemical vapor deposition of the present invention is not particularly limited. Any chemical vapor deposition known in the art, such as thermal chemical vapor deposition or plasma chemical vapor deposition, may be used as long as it can grow the conductive carbon nanoparticle on each core.

In addition, in the chemical vapor deposition process, an appropriate amount of water vapor may be added to the reaction chamber in order to reduce the deposition of non-conductive carbon and promote the growth of graphitized conductive carbon. It is used to increase the conductivity level of the conductive carbon nanoparticle or the efficiency of using the iron source and carbon source. However, the present invention is not limited thereto.

In the present invention, the predetermined temperature is in a range from 500° C. to 1300° C., preferably from 600° C. to 850° C., and more preferably from 650° C. to 700° C. However, the present invention is not limited thereto.

The present invention further provides a composite electrode, comprising a substrate on which an active material layer is disposed, wherein the active material layer comprises, but is not limited to, the aforementioned composite electrode material and an adhesive.

In the composite electrode of the present invention, the substrate may be a conductive metal substrate. The material of the conductive metal substrate may, by way of example and not limitation, be a copper foil commonly used in the art. Moreover, the thickness of the copper foil is not particularly limited and may be adjusted if necessary.

In the composite electrode of the present invention, the adhesive is not particularly limited. The adhesive may, by way of example and not limitation, be sodium carboxymethyl cellulose (NaCMC) or poly acrylic acid (PAA). In one embodiment of the present invention, the adhesive is NaCMC.

In the composite electrode of the present invention, the composite electrode material is prepared by the aforementioned method, and thus will not be described herein.

In a common manufacturing method of silicon-based electrode, it is necessary to additionally add auxiliary materials such as carbon black to enhance the electron conduction between silicon particles and the electron conduction to the current collector. However, the additional carbon black increases the weight and volume of the electrode and is different from the conductive carbon nanoparticle grown on the surface of silicon, which provides a high efficiency in buffer function for expansion/contraction of the silicon particles. Since the conductive carbon nanoparticles may provide additional conductive paths, the capacity of the composite electrode can be maintained after repeated charge/discharge even though the carbon black is not added as an auxiliary conductive path during the manufacturing of the composite electrode according to one embodiment of the present invention.

The present invention further provides a lithium-based battery, comprising: the aforementioned composite electrode; a lithium-containing counter electrode; a separator disposed between the composite electrode and the lithium-containing counter electrode; and an electrolyte disposed between the composite electrode and the lithium-containing counter electrode and also disposed on both sides of the separator.

As described above, the composite electrode material of the present invention has a special structure, wherein the conductive carbon nanoparticle is directly grown on the core so as to cover the silicon flake. Thereby, it may buffer a stress resulted from a volume change in the core material during charge/discharge, and avoid the over-reaction between the core and the electrolyte. Thus, the battery's cycle life can be increased. At the same time, the conductive carbon nanoparticles may provide conductive paths between the silicon flake and its surrounding in the battery, so the excellent charge/discharge properties of the composite electrode can be maintained even without adding carbon black during the manufacturing process. Therefore, the lithium based battery provided by the present invention has long battery cycle life and high capacity, and has good charge/discharge properties and coulombic efficiency after multiple charge/discharge cycles.

Other objects, advantages, and novel features of the invention will become more apparent from the following detailed description when taken in conjunction with the accompanying drawings.

DETAILED DESCRIPTION OF THE PREFERRED EMBODIMENT

The following embodiments when read with the accompanying drawings are made to clearly exhibit the above-mentioned and other technical contents, features and/or effects of the present disclosure. Through the exposition by means of the specific embodiments, people would further understand the technical means and effects the present disclosure adopts to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Preparation of Composite Electrode Material—Manufacturing Process 1

Figure 1A:
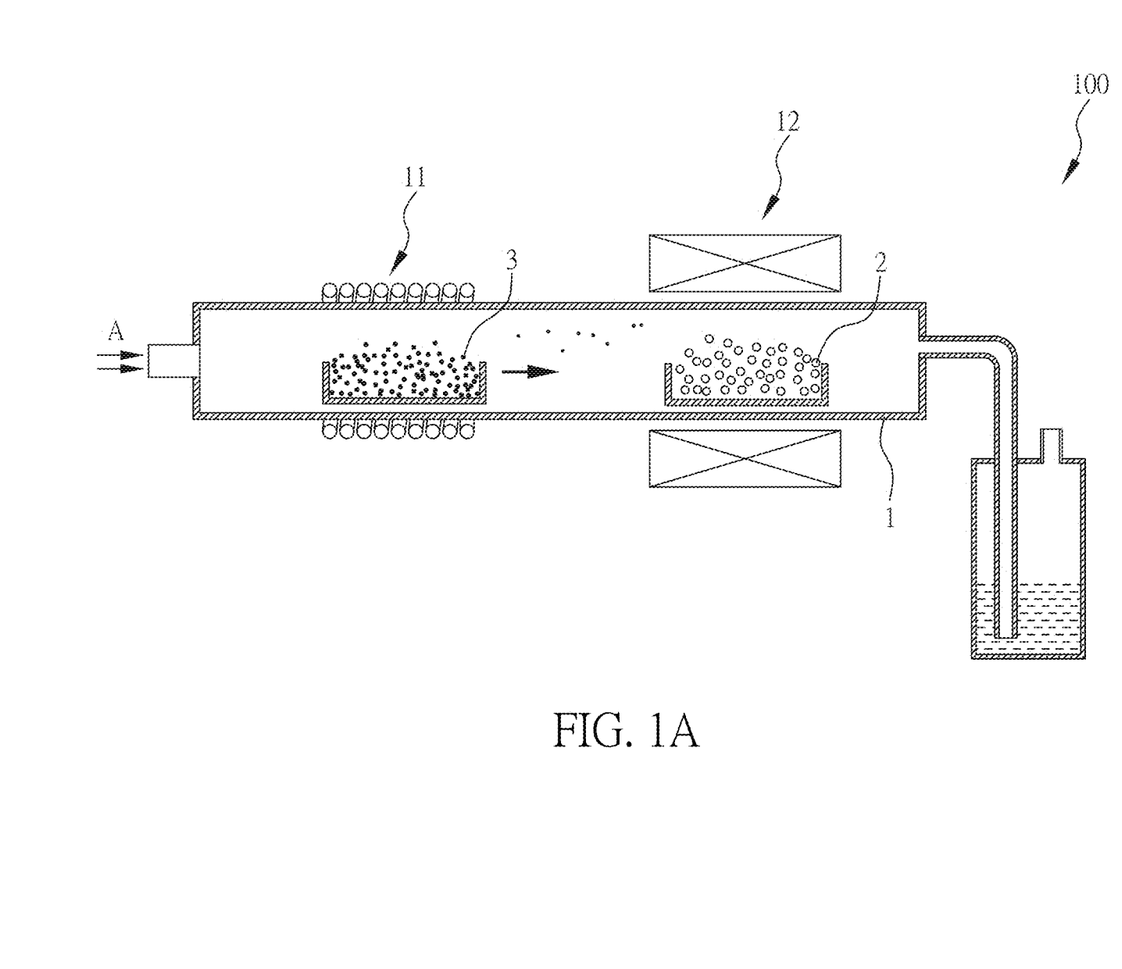
FIG. 1A and FIG. 1B are schematic diagrams showing a manufacturing process according to an embodiment of the present invention.
Figure 1B:
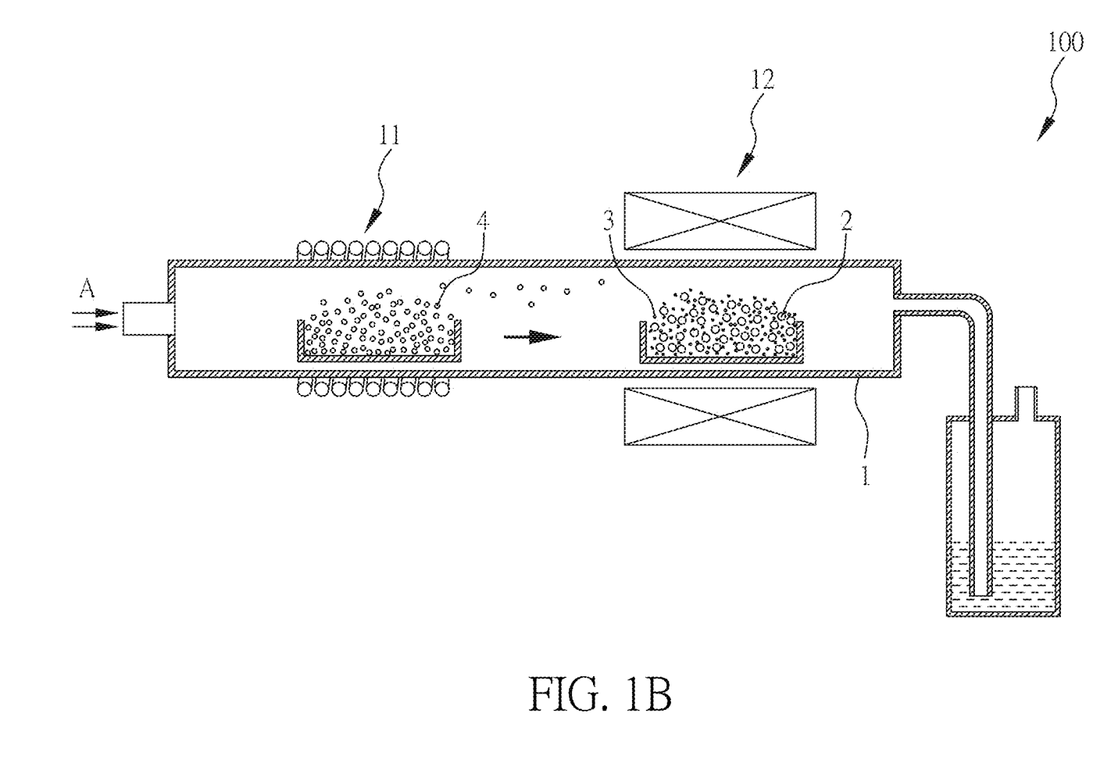

FIGS. 1A and 1B are schematic diagram showing a manufacturing process of the present embodiment. Silicon flakes 2 (0.7 g) having an average thickness of 100 nm and an average length of about 850 nm were provided in a second zone 12 of a chamber 1 of a thermal chemical vapor deposition system 100, and ferrocene 3 (1.8 g) used as an iron and carbon source was provided in a first zone 11 of a chamber 1. First, the chamber 1 was evacuated to a high vacuum, and then argon gas (600 sccm, 4 minutes) was backfilled to the chamber 1 in a direction A in order to maintain the chamber 1 at 1 atmospheric pressure. The steps of vacuuming and backfilling the argon gas were repeated to ensure that there was no other gas left in the chamber 1. The argon gas (600 sccm) kept flowing into the chamber in the direction A, and a high temperature furnace was turned on to ensure that the first zone 11 was heated to about 160° C., and the second zone 12 was heated to about 650° C. Thereby, the ferrocene 3 was decomposed and volatilized, the iron particles might be in vapor form and permeate into the gaps between the silicon flakes 2, and the deposition time was about 15 minutes. Lastly, the high temperature furnace was turned off, and the chamber 1 was cooled down to room temperature so as to obtain silicon flakes with iron, iron compound and carbon deposited thereon. Next, camphor 4 (4 g) used as an additional carbon source was provided in the first zone 11, the chamber 1 was again evacuated to a vacuum, and argon gas (600 sccm, 4 minutes) backfilled the chamber in the direction A to reach 1 atmospheric pressure. Moreover, the steps of vacuuming and backfilling the argon gas were repeated to ensure that there was no other gas left in the chamber 1. The argon gas (600 sccm) kept flowing into the chamber in the direction A, and the high temperature furnace was turned on in order to heat the first zone 11 to about 160° C. and heat the second zone 12 to about 650° C. Thereby, the camphor was decomposed and volatilized, the carbon source (camphor) might permeate to the gap between the silicon flakes so as to grow conductive carbon nanoparticles, and the deposition time was about 15 minutes. Lastly, the high temperature furnace was turned off, and the chamber 1 was cooled down to room temperature to obtain silicon nanoparticles coated with the conductive carbon nanoparticles.

In another embodiment of the present invention, a rotating or agitating device (not shown) may be disposed in the second zone 12 to evenly mix the conductive carbon particles and the silicon flakes (i.e. cores) so that the conductive carbon nanoparticles might grow on the cores more evenly. In another embodiment of the present invention, quartz plates (not shown) may be disposed on two sides of the chamber 1 to increase the residence time of the gas of the raw materials in the zone designated for carbon growth and reaction. Thereby, it may avoid waste of the iron source and carbon source, and affect the coverage of the conductive carbon nanoparticles on the cores.

Preparation of Composite Electrode Material—Manufacturing Process 2

Figure 2A:
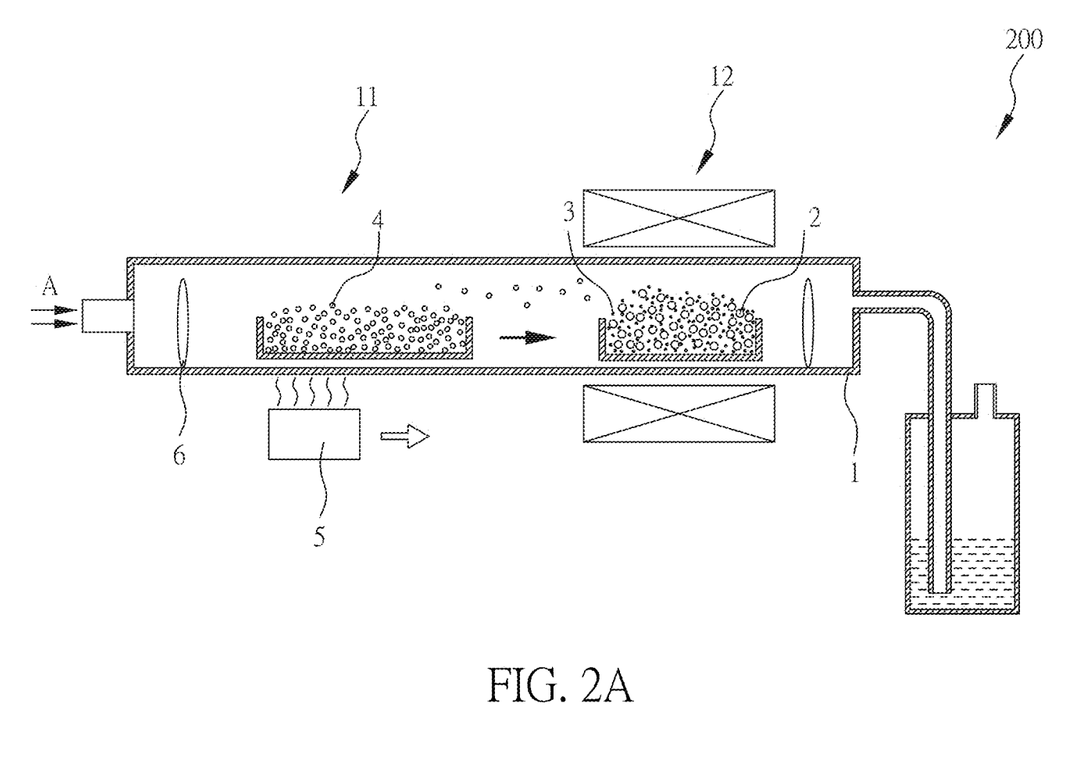
FIG. 2A to FIG. 2C are schematic diagrams showing a manufacturing process according to another embodiment of the present invention.
Figure 2B:
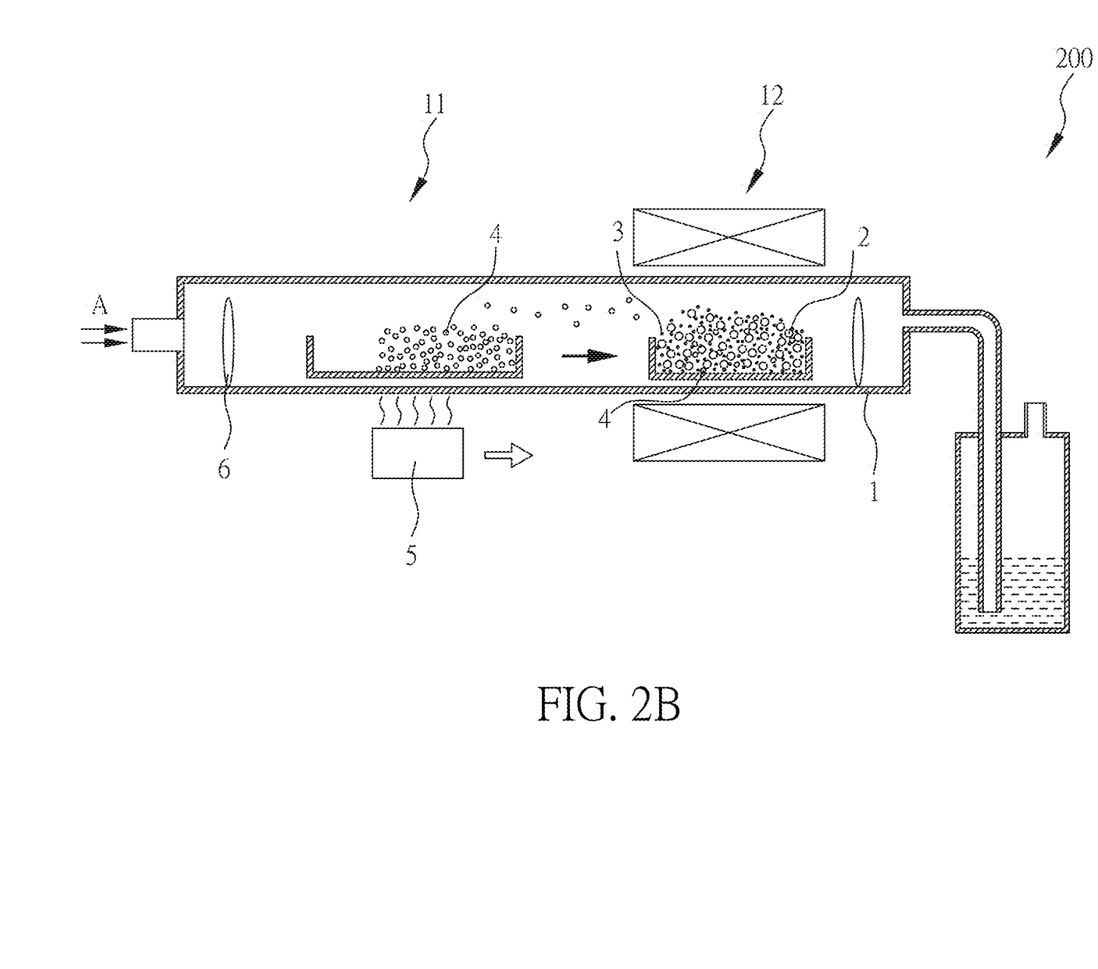
Figure 2C:
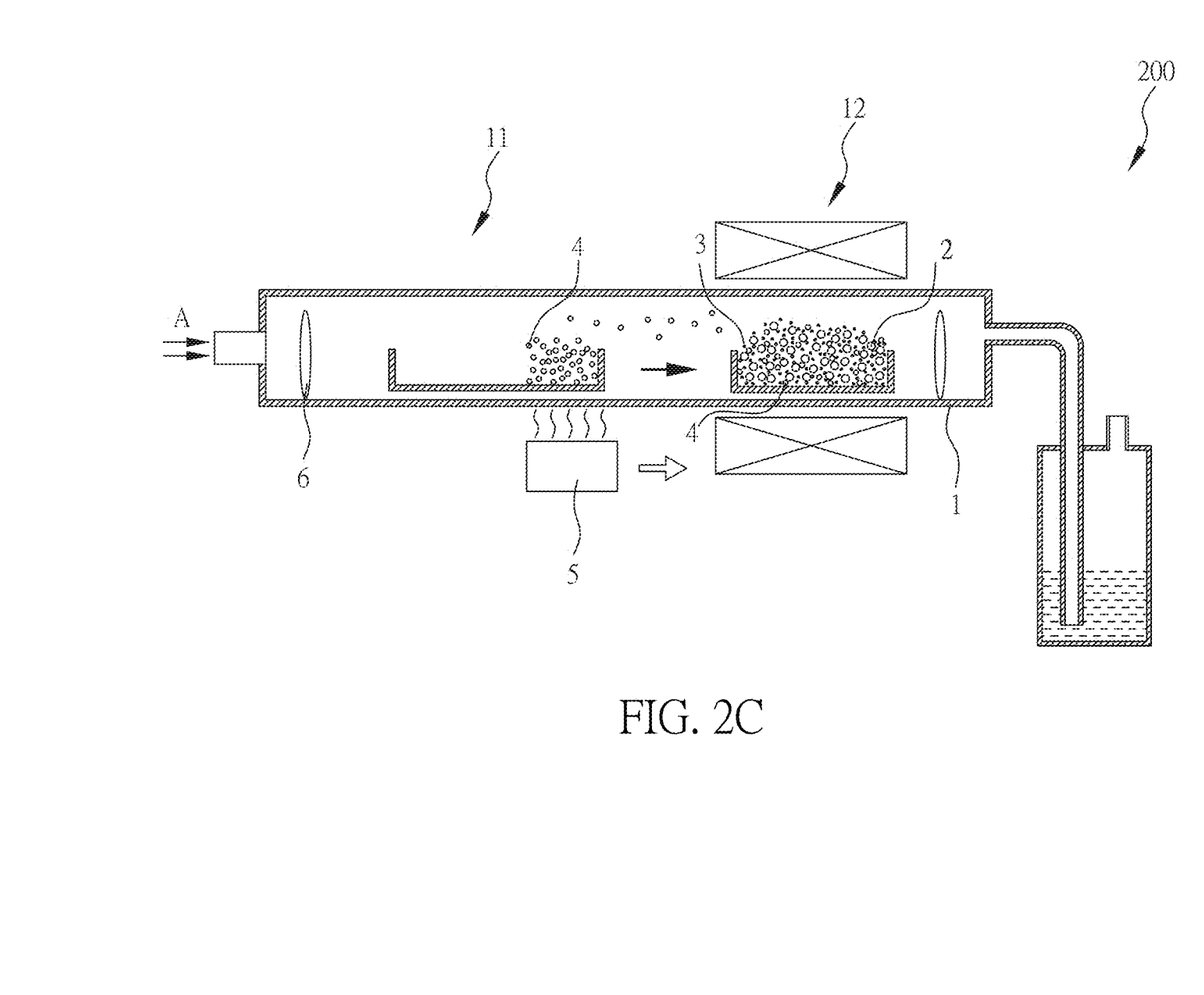

FIG. 2A to 2C are schematic diagrams showing the manufacturing process of the present embodiment. The method for manufacturing a composite electrode material of the present embodiment is similar to Manufacturing Process 1, except for the following differences.

In the present embodiment, the chemical vapor deposition system 200 further comprised a mobile heating device 5 disposed in the first zone 11. When the camphor 4 was provided as a carbon source in the first zone 11, the mobile heating device 5 was heated to about 160° C., and the heating device 5 was moved at a predetermined speed. Thereby, the camphor 4 in the first zone 11 was decomposed and volatilized gradually to permeate into the gap between the silicon flakes to grow conductive carbon nanoparticles. Herein, the predetermined speed is not particularly limited as long as the carbon source (camphor) can be decomposed and volatilized. In such chemical vapor deposition, the mobile heating device 5 was used to control the heating zone in order to control the volatilization rate of the raw materials, and thereby the coverage of the conductive carbon nanoparticles on the silicon flakes was affected.

In another embodiment of the present invention, a rotating or agitating device (not shown) may be disposed in the second zone 12 to evenly mix the conductive carbon particles and the silicon flakes (i.e. cores) so that the conductive carbon nanoparticles may grow on the cores more evenly. In another embodiment of the present invention, quartz plates 6 (not shown) may be disposed on two sides of the chamber 1 to increase the residence time of the gas of the material. Thereby, it may avoid waste of the iron source and carbon source, and affect the coverage of the conductive carbon nanoparticles on the cores. In the present embodiment, the quartz plates 6 are disposed on two sides of the chamber 1. However, the present invention is not limited thereto. For instance, the quartz plate 6 may be disposed on one side of the chamber 1 only.

Preparation of Composite Electrode Material—Manufacturing Process 3

Figure 3:
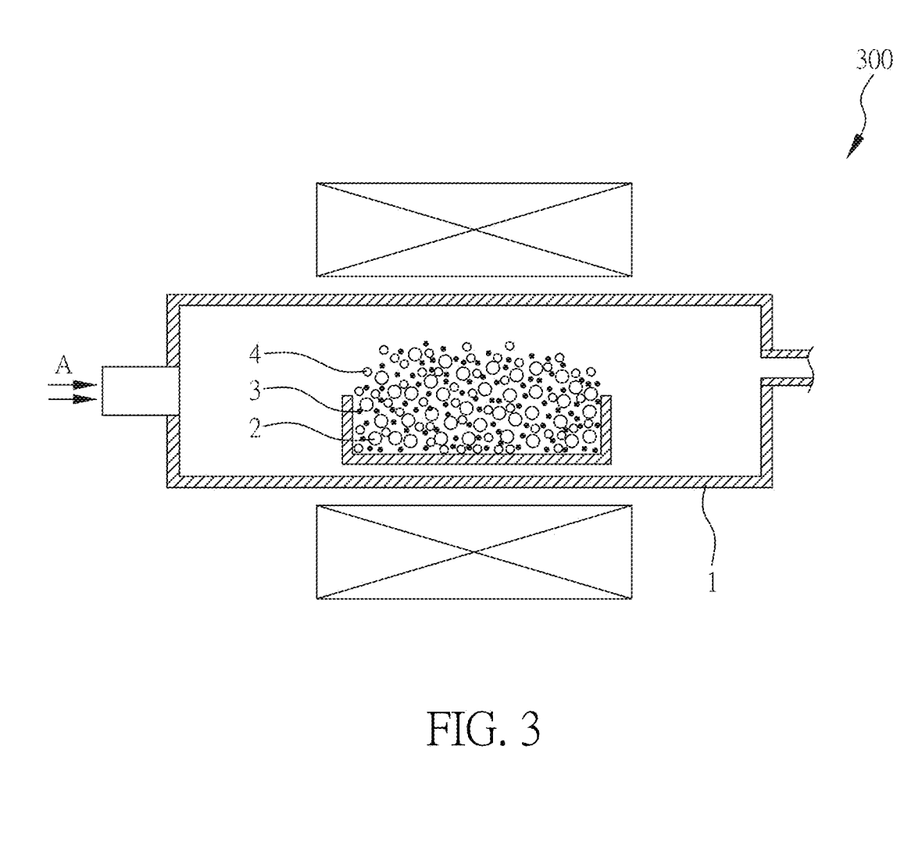
FIG. 3 is a schematic diagram of a manufacturing process according to another embodiment of the present invention.

FIG. 3 is a schematic diagram showing a manufacturing process of the present embodiment. Silicon flakes 2 (1.86 g) having an average thickness of 100 nm and an average length of about 850 nm, ferrocene 3 (1.8 g), and camphor 4 (4 g) were provided in a chamber 1 of a thermal chemical vapor deposition system 300.

The chamber 1 was diluted to remove the air in the chamber 1, then argon or nitrogen gas backfilled to the chamber 1 in a direction A to reach about 1 atmospheric pressure, and then the gas inlet and outlet of the chamber 1 were closed. A high temperature furnace was turned on to heat the chamber to about 650° C. in order to allow the ferrocene 3 and camphor 4 volatilize, the gaseous ferrocene 3 and gaseous camphor 4 were retained in the chamber 1, conductive carbon nanoparticles grew on the silicon flakes 2 under the catalyzing of iron source (ferrocene 3), and the deposition time was about 15 minutes. Lastly, the high temperature furnace was turned off, and the chamber 1 was cooled down to room temperature to obtain silicon nanoparticles coated with the conductive carbon nanoparticles. In another aspect of the present invention, a rotating or agitating device (not shown) may be disposed to evenly mix the silicon flakes 2, ferrocene 3 and camphor 4 so that the conductive carbon nanoparticles may grow on the cores more evenly.

From the aforementioned Manufacturing Process 1 to Manufacturing Process 3, the conductive carbon nanoparticles were grown at normal pressure. The conductive carbon nanoparticles may grow at any atmospheric pressure. In other embodiment of the present invention, the conductive carbon nanoparticles may grow at a low vacuum (such as 1 Torr to 1000 Torr), or a higher atmospheric pressure.

Composite Electrode Material

Figure 4A:
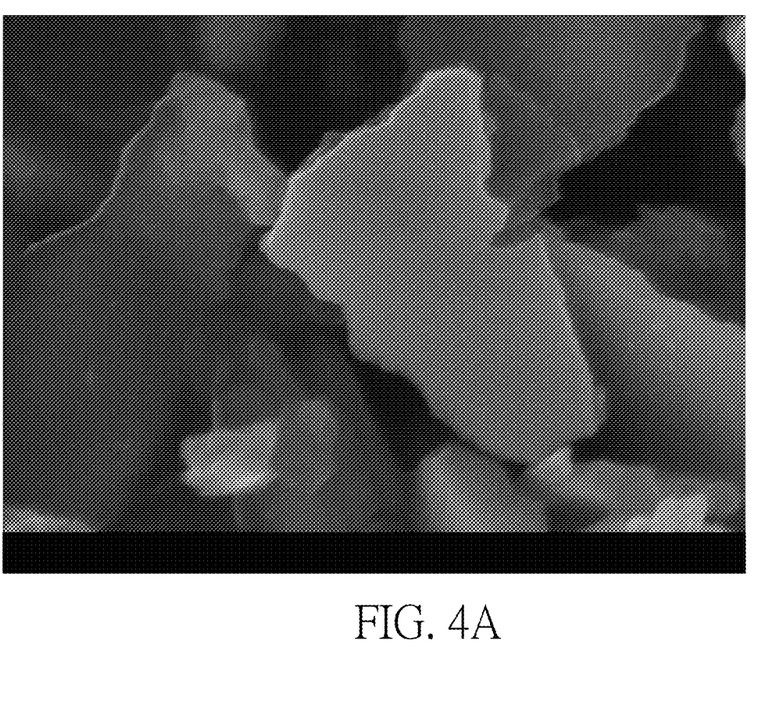
FIG. 4A is an SEM image of a silicon flake according to an embodiment of the present invention.
Figure 4B:
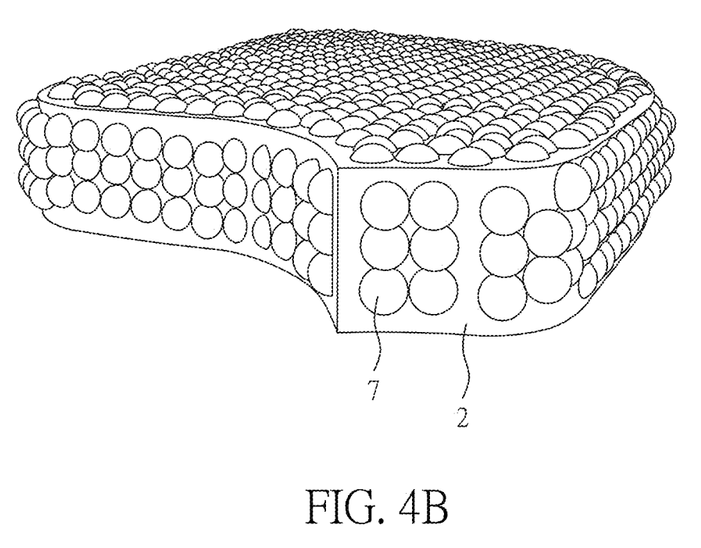
FIG. 4B is a schematic diagram of a composite electrode material of the present invention.

FIG. 4A is an SEM image showing a silicon flake of the present invention, wherein the silicon flake has a thickness of about 100 nm and a length of about 850 nm, and the silicon flake is in an irregular shape. FIG. 4B is a schematic diagram showing a composite electrode material of the present invention. The silicon flake 2 is a flat particle, and the conductive carbon nanoparticles 7 are directly grown on the silicon flake 2 to provide a conductive path. Furthermore, a catalyst is covered by the conductive carbon nanoparticle 7 to avoid direct contact with the electrolyte of the battery. Besides, since there is a space between the conductive carbon nanoparticles 7, the height of the conductive carbon nanoparticles 7 is also present between two laminated silicon flakes 2. Therefore, the space between the conductive carbon nanoparticles 7 provides a buffer space to silicon flakes 2 for volume change, and it may decrease the occurrence of fragmentation of the silicon flakes.

Figure 4C:
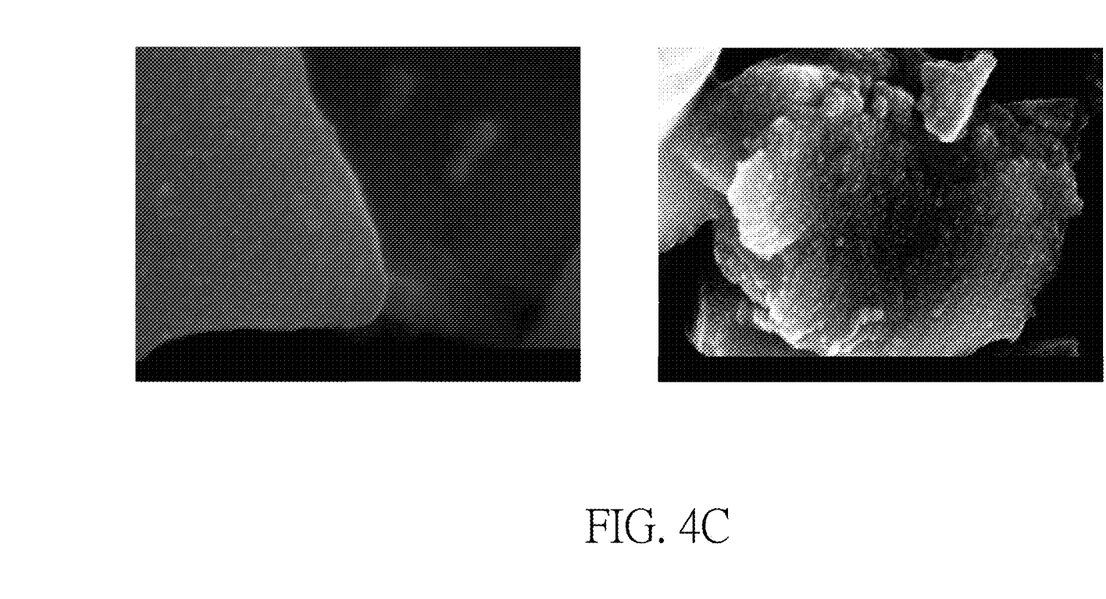
FIG. 4C is an SEM image of a composite electrode material according to an embodiment of the present invention.
Figure 4D:
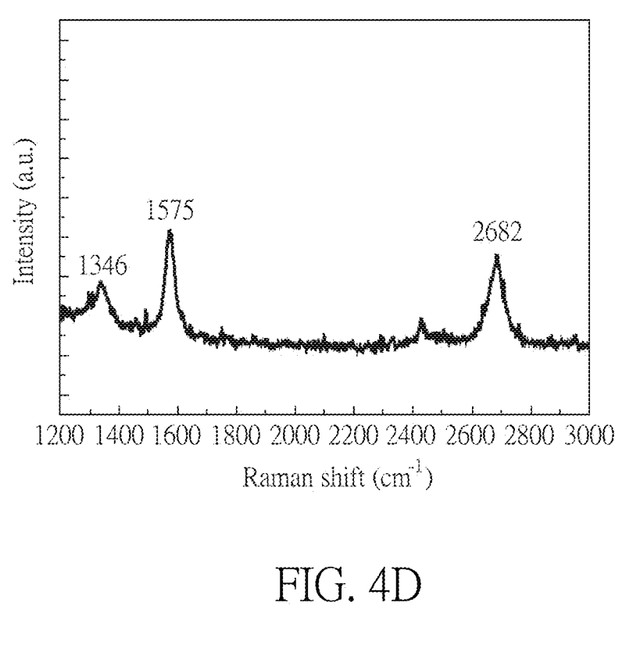
FIG. 4D is a Raman spectrum of a composite electrode material according to an embodiment of the present invention.

FIG. 4C is an SEM image showing a composite electrode material of the present embodiment, and it is apparent from the figure that the silicon flake has the conductive carbon nanoparticles grown on the silicon flake after thermal chemical vapor deposition. FIG. 4D is a Raman spectrum of the composite electrode material of the present embodiment obtained by using a green laser ($\lambda$=532 nm). A D-band of 1346 $cm^{-1}$, a G-band of 1575 $cm^{-1}$, and a Raman 2D-band of 2682 $cm^{-1}$ proving the growth of the conductive graphitized carbon nanoparticles on the surface of the silicon flake are shown in the figure.

Above experimental results demonstrates that the composite electrode material of the present embodiment truly contains a silicon flake with the conductive carbon nanoparticle grown thereon.

Preparation of Composite Electrode

The composite electrode material of the present invention prepared as described above, conductive carbon black, and adhesive NaCMC were mixed at a weight ratio of 6:3:1. And then the mixture was added with deionized water, and stirred with a DC stirring machine until the mixture was even to obtain an active material. The active material was provided in a vacuum chamber, evacuated to a low pressure to remove trapped gases from the active material, and followed by using a scraper to coat on a copper foil (10 µm) with the active material (30 µm of thickness) to obtain an electrode. After that, the coated electrode was provided in a vacuum oven, evacuated to a vacuum, and baked at 65° C. for 8 to 12 hours to remove excess solvent. After cooling, a roller press machine was applied to roll the baked electrode to increase the packaging density of the electrode. Lastly, the electrode was cut into a desired size by a cutter knife. In one aspect of the present invention, the active material for preparing the composite electrode may not comprise the conductive carbon black. However, the thickness of the active material coating and the pressure applied by the roller machine of the present invention are not limited thereto.

Preparation of Lithium Half-Cell

Figure 5:
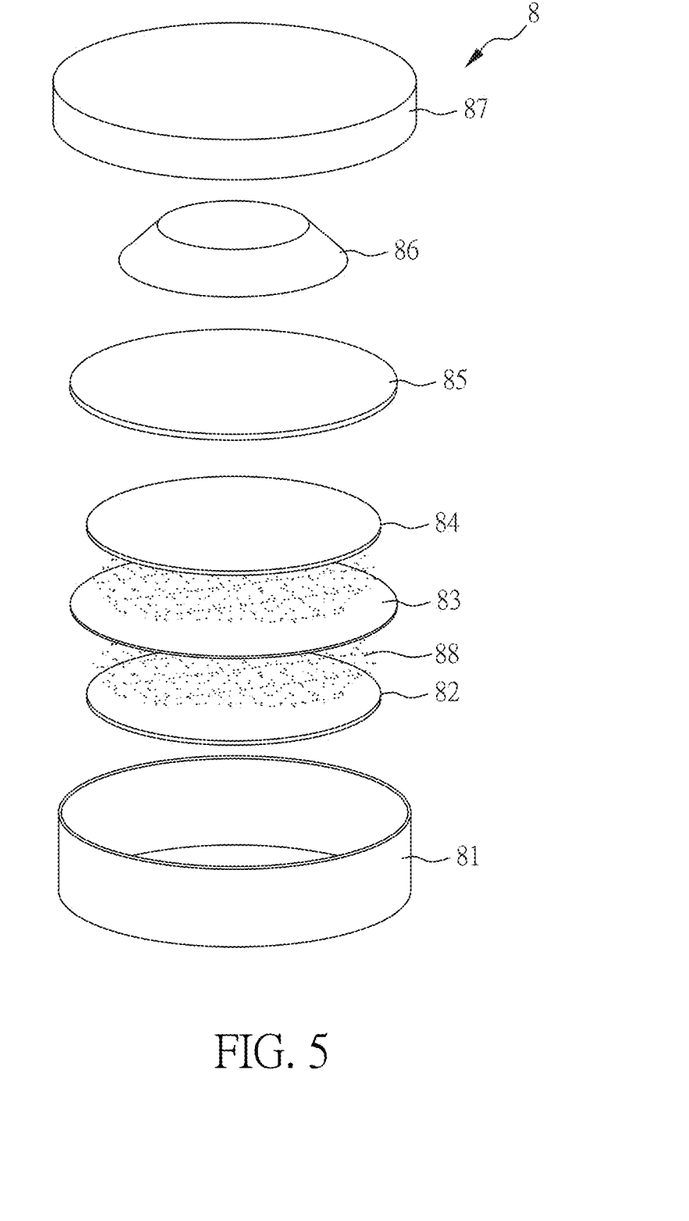
FIG. 5 is a schematic diagram of a Li-based battery according to an embodiment of the present invention.

FIG. 5 is a schematic diagram showing a Li-based battery 8 of the present embodiment. Herein, a composite electrode 82 prepared as described above (served as a negative electrode), a metal bottom cover 81, a lithium-containing counter electrode 84, a separator 83 (Celgard 2355), a metal gasket 85, a metal spring 86, and a metal top cover 87 were provided in a glove box. Further, 1M $LiPF_6$ solution dissolved in EC/DEC (1:1 v/v) was used as an electrolyte 88.

The abovementioned materials were assembled into a button cell according to FIG. 5, and then sealed with a battery packaging machine to form a lithium half-cell of the present embodiment. Herein, this embodiment is merely illustrative, and the lithium half-cell of the present invention is not limited thereto.

As shown in FIG. 5, the lithium battery of the present embodiment comprised: a composite electrode 82 prepared as described above; a lithium-containing counter electrode 84; a separator 3 disposed between the composite electrode 82 and the lithium-containing counter electrode 84; and an electrolyte 88 disposed between the composite electrode 82 and the lithium-containing counter electrode 84 and also disposed on both sides of the separator 83.

Analysis of Charge/Discharge Cycle

In the charge/discharge process of the present embodiment, the charge/discharge rate for the first 3 cycles was 0.02 C, the charge/discharge rate from the 3rd to 13th cycle was 0.5 C, the charge/discharge rate from the 13th to 23rd cycle was 1 C, the charge/discharge rate from the 23rd to 33rd cycle was 0.5 C, and the charge and discharge rate from the 33rd to 43rd cycle was 0.1 C. The composite electrode material and the composite electrode were prepared by the aforementioned methods, and thus will not be described herein.

Figure 6A:
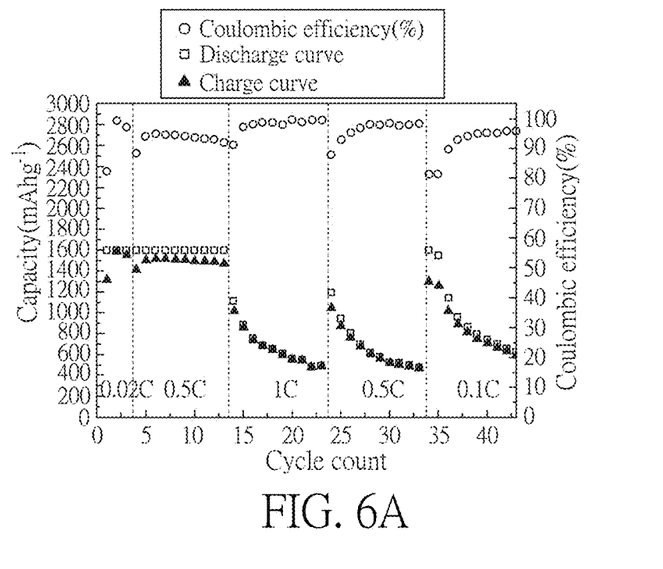
FIG. 6A is a graph showing a relationship between the capacity and cycle count of a silicon electrode at a constant capacity of 1600 mAhg$^{-1}$ according to an embodiment of the present invention.
Figure 6B:
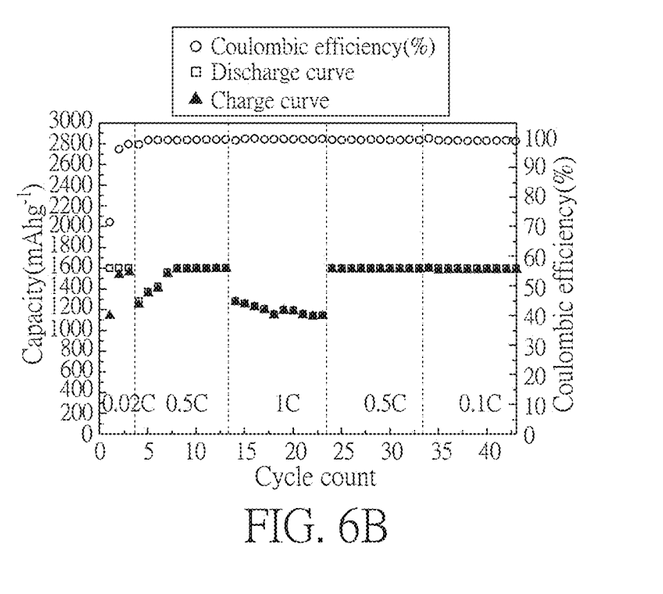
FIG. 6B is a graph showing a relationship between the capacity and cycle count of the composite electrode at a constant capacity of 1600 mAhg$^{-1}$ according to an embodiment of the present invention.

FIG. 6A and FIG. 6B are graphs showing relationships between the capacity and cycle count at a constant capacity of 1600 mAhg$^{-1}$ for a silicon electrode and composite electrode, respectively. It was found in the FIG. 6A that the silicon electrode might maintain the charge/discharge cycle count at a constant capacity of 1600 mAhg$^{-1}$ and at relatively low charge/discharge rate. However, the capacity significantly dropped if the charge/discharge rate was increased to 1 C, and the damage was irreversible even if the charge/discharge rate was decreased to 0.5 C or 0.1 C afterwards. In contrast, the composite electrode disclosed by the present invention maintained the charge/discharge cycle count at a constant capacity of 1600 mAhg$^{-1}$ and at a relatively low charge/discharge rate. And it still had a capacity of about 1200 mAhg$^{-1}$ when the charge/discharge rate was increased to 1 C. Furthermore, the capacity may be recovered to 1600 mAhg$^{-1}$ after lowering the charge/discharge rate to 0.5 C or 0.1 C, and the charge/discharge cycle stayed stable.

Figure 7:
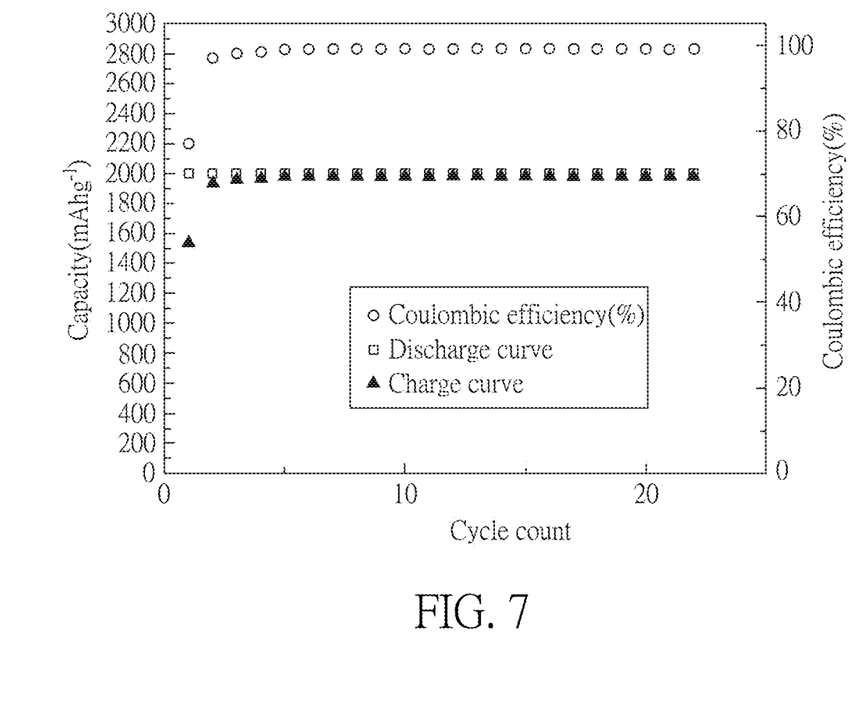
FIG. 7 is a graph showing a relationship between the charge/discharge capacity and cycle count of the composite electrode at a constant capacity of 2000 mAhg$^{-1}$ according to an embodiment of the present invention.

FIG. 7 is a diagram showing a relationship between a capacity and cycle count at a constant capacity of 2000 mAhg$^{-1}$ for the composite electrode of another embodiment according of the present invention. In the present embodiment, the charge/discharge rate was 0.1 C. It can be found in FIG. 7 that the composite electrode of the present invention may maintain a stable charge/discharge cycle count even at high capacity.

The experimental results described above demonstrate that a silicon flake with the conductive carbon nanoparticles grown thereon may buffer the volume expansion and contraction when the silicon flake is under charge/discharge. Thereby, the occurrence of fragmentation of the silicon flake may be decreased, and the cycle life may be prolonged. Even though the silicon flake is broken, the conductive carbon nanoparticles may provide a conductive path so that the battery may maintain stable charge/discharge cycles.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a composite electrode material, comprising steps of:
   providing a core in a chamber, wherein a material of the core is at least one selected from the group consisting of Sn, Sb, Si, Ge, C, a compound and a complex thereof; and
   providing a gas into the chamber to grow a conductive carbon nanoparticle on a surface of the core at a predetermined temperature by a chemical vapor deposition with a catalyst,
   wherein the conductive carbon nanoparticle covers the catalyst, and
   the gas comprises water vapor.

2. The method of claim 1, wherein the predetermined temperature is in a range from 650° C. to 700° C.

3. The method of claim 1, wherein the chemical vapor deposition comprises a step of: using a rotating machine or an agitating machine to evenly mix the conductive carbon nanoparticle and the core.

4. The method of claim 1, wherein the chemical vapor deposition comprises a step of: controlling a heating zone by a mobile heating device.

5. The method of claim 1, wherein the chamber comprises a baffle plate disposed on two sides of the chamber.

6. The method of claim 5, wherein the baffle plate is a quartz plate.

7. The method of claim 1, wherein the chemical vapor deposition is a thermal chemical vapor deposition.

8. The method of claim 1, wherein the catalyst is a Fe-based catalyst.

9. The method of claim 1, wherein the core is a flat core.

10. The method of claim 1, wherein a thickness of the core is in a range from 50 nm to 500 nm.

11. The method of claim 1, wherein an average length of the core is in a range from 100 nm to 9 μm.

12. The method of claim 1, wherein a diameter of the conductive carbon nanoparticle is in a range from 1 nm to 100 nm.

* * * * *